(12) United States Patent
Ichikawa et al.

(10) Patent No.: US 7,409,268 B2
(45) Date of Patent: Aug. 5, 2008

(54) METHOD FOR ACTUATING ACTIVE VIBRATION INSULATORS

(75) Inventors: Hiroyuki Ichikawa, Kani (JP); Takayoshi Yasuda, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 454 days.

(21) Appl. No.: 11/100,478

(22) Filed: Apr. 7, 2005

(65) Prior Publication Data

US 2005/0248070 A1 Nov. 10, 2005

(30) Foreign Application Priority Data

Apr. 13, 2004 (JP) ............... 2004-118290

(51) Int. Cl.
*G01M 1/38* (2006.01)
(52) U.S. Cl. .............. 700/280; 701/111; 73/579
(58) Field of Classification Search ............ 700/275, 700/280; 701/46, 47, 111; 73/570, 576, 73/578, 579, 584
See application file for complete search history.

(56) References Cited

U.S. PATENT DOCUMENTS

| | | | | |
|---|---|---|---|---|
| 5,111,507 A | * | 5/1992 | Nakaji | 381/71.9 |
| 5,349,537 A | * | 9/1994 | Burger et al. | 700/280 |
| 5,544,080 A | * | 8/1996 | Kobayashi et al. | 700/280 |
| 5,792,948 A | * | 8/1998 | Aoki et al. | 73/116 |
| 5,893,892 A | * | 4/1999 | Loeffler | 701/29 |
| 5,912,821 A | * | 6/1999 | Kobayashi | 700/280 |
| 6,018,689 A | * | 1/2000 | Kumura et al. | 700/280 |
| 6,256,545 B1 | * | 7/2001 | Kimura et al. | 700/28 |
| 6,459,970 B2 | * | 10/2002 | Goto et al. | 701/36 |
| 2002/0066985 A1 | | 6/2002 | Muramatsu et al. | |

FOREIGN PATENT DOCUMENTS

| | | |
|---|---|---|
| JP | 5-11784 | 1/1993 |
| JP | 11-223237 | 8/1999 |
| JP | 11-247920 | 9/1999 |
| JP | 2001-117644 | 4/2001 |

OTHER PUBLICATIONS

Pietrangelo, Joel D. "NCT closer to smoothing engines-Noise Cancellation Technologies Inc- Tech & Trends", Looksmart, Primedia Business Magazines & Media Inc, pp. 1-2.*

(Continued)

*Primary Examiner*—Albert DeCady
*Assistant Examiner*—Chad Rapp
(74) *Attorney, Agent, or Firm*—Oblon, Spivak, McClelland, Maier & Neustadt, P.C.

(57) ABSTRACT

A method for actuating active vibration insulators includes the steps of generating an idling control signal in an idling range of a vehicle, generating a running control signal in a running range of the vehicle, and actuating an electromagnetic actuator of an active vibration insulator based on the idling control signal or the running control signal, thereby inhibiting vibrations of a vehicle engine from transmitting by the electromagnetic actuator. The idling control signal is produced by adding a higher order harmonic signal component with respect to a control frequency, based on a cyclic pulsating signal emitted from the vehicle engine, to a fundamental-wave signal component of the control frequency. The running control signal is composed of the fundamental-wave signal component of the control signal. The method can inhibit noises from generating by actuating simple electromagnetic actuators, and can damp vibrations of vehicle engines simply and less expensively.

6 Claims, 4 Drawing Sheets

OTHER PUBLICATIONS

Lee et al. "Performance Test Of Active Engine Mount System in Passenger Car", Seventh Internatio Congress on Sound and Vibration, Jul. 200, pp. 403-410.*

I Car Advantage "Active Engine Mounts", Mar. 19, 2007, pp. 1-2.*

Guan et al., "Robust Identification and Control Design for Engine Mount", Dec. 1997, Proceedings of the 36th Conference on Decsion & Control, IEEE pp. 858-859.*

* cited by examiner

METHOD FOR ACTUATING ACTIVE VIBRATION INSULATORS

BACKGROUND OF THE INVENTION

1. Field of the Invention

The present invention relates to a method for actuating active vibration insulators which actively inhibit vibrations of vehicle engines from transmitting.

2. Description of the Related Art

As a conventional method for actuating such active vibration insulators, a highly linear actuator, such as a voice coil motor, for example, has been used to actuate an active vibration insulator with a sine-wave control signal, thereby controlling vibrations with great vibrating forces but with less noises. However, since such a high-performance actuator is highly expensive, it is difficult to use it in vehicles for which it is necessary to inhibit the vibrations of engines from transmitting simply and less expensively.

Moreover, as the other active vibration insulator, an electromagnetic vibrator has been known as disclosed in Japanese Unexamined Patent Publication (KOKAI) No. 2001-117, 644, for instance. The conventional electromagnetic actuator comprises an electromagnetic damper, and actuation controlling means. The electromagnetic damper comprises a fastener fitting, a yoke, a rubber elastic member, and a mass member. The fastener fitting is installed to a vehicle, a vibration generating force. The yoke accommodates an electromagnet therein, and is installed to the fastener fitting. The mass member is supported elastically to the yoke by the rubber elastic member. The actuation controlling means inputs electric control signals into the electromagnet of the electromagnetic damper, and lets the electromagnet generate actuating forces having magnitudes which correspond to the magnitudes of the electric control signals. Thus, the conventional electromagnetic actuator actuates the electromagnet to vibrate the mass member, thereby actively inhibiting the vibrations of the vibration generating source from transmitting by means of vibrating forces resulting from the vibrations of the mass member.

The conventional electromagnetic vibrator generates pulsating control signals with respect to rotary pulsating signals which are output from a rotary pulse sensor, for example, and whose frequencies are correlated to the vibration frequencies of the vibration generating source. Moreover, the pulsating control signals are synchronized with the rotary pulsating signals, but simultaneously have phases which are displaced with respect to the phases of the rotary pulsating signals. In addition, the pulsating control signals have control amplitudes which correspond to the vibration amplitudes of the vibration generating source and whose magnitudes are correlated to the magnitudes of duty ratios. Based on the pulsating control signals, the conventional electromagnetic vibrator gives vibrations to the mass member with the actuation controlling means, thereby inhibiting the vehicle from vibrating by means of vibrating forces resulting from the vibrations of the mass member.

However, when an engine is installed to a sub frame of vehicles, the conventional electromagnetic vibrator is installed to the sub frame as well.

Note herein that, when the conventional electromagnetic vibrator turns on or off the pulsating control signals, a secondary or tertiary harmonic signal component arises with respect to a datum frequency in the actuating signals for actuating the electromagnet. Moreover, when the frequency band of the secondary or tertiary harmonic signal component falls around the resonance frequency band of the sub frame, the secondary or tertiary harmonic signal component resonates to a vibration of the sub frame. Here, the phrase, "when the frequency band of the secondary or tertiary harmonic signal component falls around the resonance frequency band of the sub frame," represents that a fundamental-wave signal component of control frequencies falls in a so-called idling range. That is, there occurs a problem that noises generate because the secondary or tertiary harmonic signal component resonates to a vibration of the sub frame in vehicles under idling. Note, however, that there occurs no such problem in vehicles under running where a fundamental-wave signal component of control frequencies has a high frequency.

SUMMARY OF THE INVENTION

The present invention has been developed in order to solve the aforementioned problems. It is therefore an object of the present invention to provide a method for actuating active vibration insulators, method which can inhibit noises from generating by actuating simple electromagnetic actuators, and which can damp the vibrations of vehicle engines simply and less expensively.

In order to achieve the aforementioned object, a method for actuating active vibration insulators according to the present invention comprises the steps of:

generating an idling control signal in an idling range of a vehicle, the idling control signal produced by adding a higher order harmonic signal component with respect to a control frequency, based on a cyclic pulsating signal emitted from a vehicle engine, to a fundamental-wave signal component of the control frequency;

generating a running control signal in a running range of the vehicle, the running control signal composed of the fundamental-wave signal component of the control signal; and actuating an electromagnetic actuator of an active vibration insulator based on one of the idling control signal and the running control signal, thereby inhibiting vibrations of the vehicle engine from transmitting by means of vibrating forces exerted by the electromagnetic actuator.

In the present method arranged as described above, the actuator is actuated based on the idling controlling signal, which is produced by adding the higher order harmonic signal component with respect to the control frequency to the fundamental-wave signal component of the control frequency, in the idling range of the vehicle, a low-frequency vibration range. As a result, not only it is to adequately damp the vibration of the vehicle whose frequency equals the control frequency, but also it is possible to inhibit the higher order harmonic signal component with respect to the control frequency from generating noises.

Moreover, the higher order harmonic signal component can preferably comprise at least one member selected from the group consisting of a secondary harmonic signal component with respect the control signal and a tertiary harmonic signal component with respect thereto. Note herein that the quaternary or more harmonic signal components with respect to the control frequency are less likely to resonate to a vibration of a sub frame of vehicles, because the disadvantageous effect resulting from the quaternary or more harmonic signal components is very minor. On the other hand, the secondary or tertiary harmonic signal component with respect to the control frequency causes the noise problem resulting from the resonance to a vibration of a sub frame of vehicles notably, because the disadvantageous effect resulting from the secondary or tertiary harmonic signal component is greater than the disadvantageous effect resulting from the quaternary or more harmonic signal components relatively. Therefore, when the secondary or tertiary harmonic signal component with respect to the control frequency is added, as the higher harmonic control signal component, to produce the idling control signal, it is possible to securely inhibit noises from generating.

Note that the present method can preferably further comprise a step of:

calculating a set-up frequency from following equation (1):

$$F_s = (NE/60)/(N_c/k) \quad (1)$$

wherein $F_s$ specifies the set-up frequency (in Hz);
NE specifies engine revolutions per 1 minute (in r/min) and falls in a range of from 1,000 to 1,5000 rpm;
$N_c$ specifies crankshaft revolutions resulting from ignitions in all engine cylinders (in r); and
k specifies the number of engine cylinders (in pieces); wherein the idling range comprises a first vibration range whose frequency is the set-up frequency or less; and
the running range comprises a second vibration range whose frequency is higher than the set-up frequency.

Moreover, the running control signal can preferably comprise a rectangle-shaped wave signal which is produced by converting a sine-wave signal of the control frequency into a rectangle-shaped wave.

When actuating the electromagnetic actuator based on the running control signal comprising a rectangle-shaped wave signal, which is produced by converting a sine-wave signal of the control frequency into a rectangle-shaped wave, in the running range of the vehicle, a high-frequency vibration range, the rectangle-shaped wave signal can compensate retarded responses of electromagnetic actuators exhibiting slow response. Accordingly, it is possible to produce sufficiently large vibrating forces. Consequently, it is possible to adequately suppress high-frequency vibrations in the running range. That is, the present method can effectively inhibit vibrations of engines from transmitting while inhibiting noises from generating with less expensive electromagnetic actuators over a wide range of vehicle driving conditions entirely.

Note that a fundamental-wave signal component of the idling control signal can preferably comprise a sine-wave signal of the control frequency, or a rectangle-shaped wave signal which is produced by converting a sine-wave signal of the control frequency into a rectangle-shaped wave. When the primary signal component of the idling control signal comprises a sine-wave signal of the control frequency, it is possible to generate vibrating forces which are adaptable to the vibrations of the vehicle engine. Accordingly, it is possible to appropriately inhibit the vibrations of the vehicle engine from transmitting. On the other hand, when the fundamental-wave signal component of the idling control signal comprises a rectangle-shaped wave signal which is produced by converting a sine-wave signal of the control frequency into a rectangle-shaped wave, it is possible to produce sufficiently large vibrating forces. Consequently, it is possible to securely inhibit the vibrations of the vehicle engine from transmitting. In particular, when a fundamental-wave signal component of the idling control signal comprises a rectangle-shaped wave signal which is produced by converting a sine-wave signal of the control frequency into a rectangle-shaped wave, it is possible to compensate insufficient responses resulting from slow-response electromagnetic actuators. Therefore, it is possible to enhance the vibrating forces exerted by the active vibration insulator.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to specific examples of the present invention using accompanied drawings.

EXAMPLE NO. 1

Figure 1:
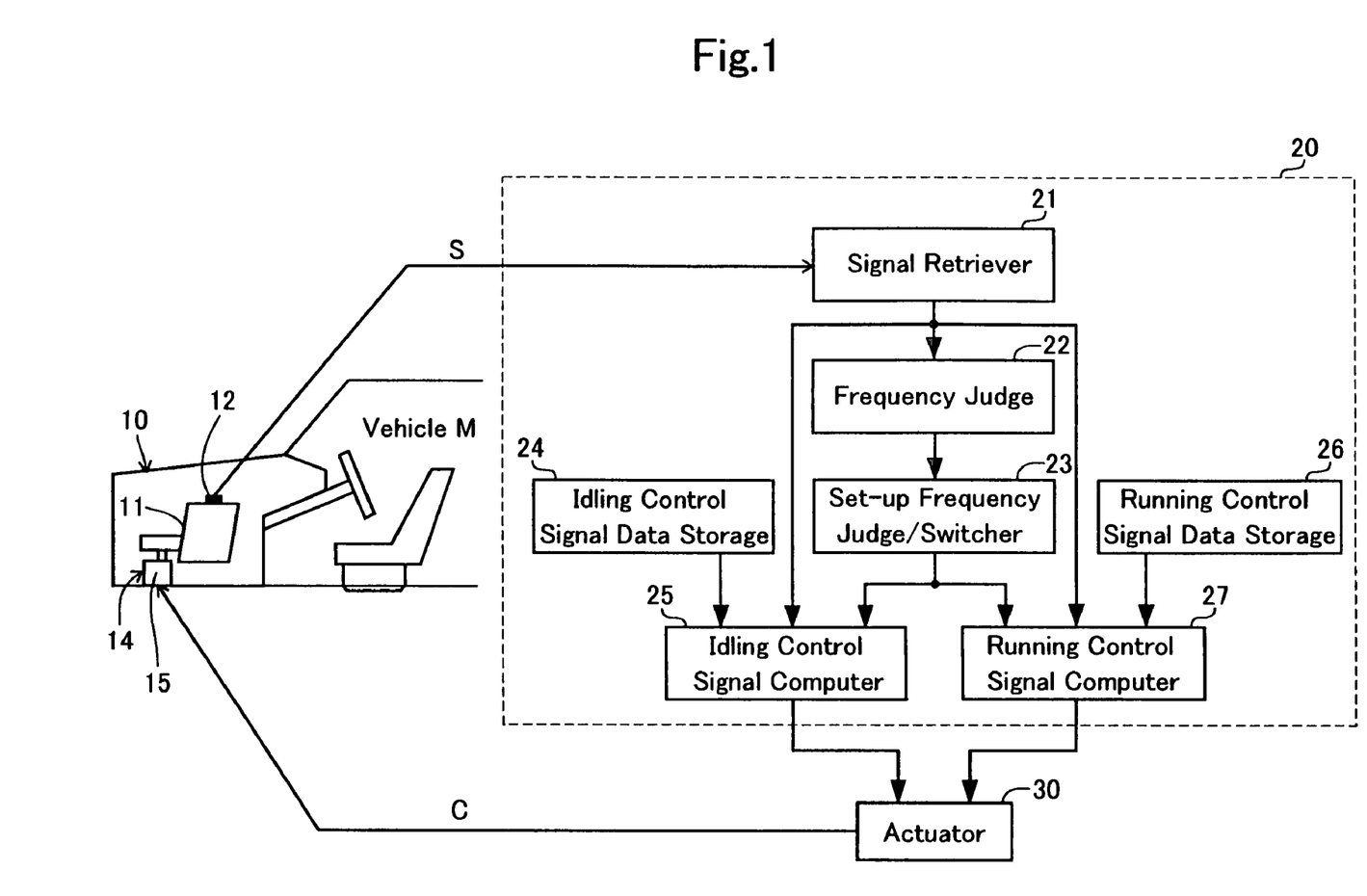
FIG. 1 is a schematic diagram for roughly illustrating an arrangement of a vibration controller according to an example of the present invention for inhibiting vibrations of a vehicle M's engine from transmitting.

FIG. 1 roughly illustrates an arrangement of a vibration controller according to Example No. 1 of the present invention by means of a schematic diagram, vibration controller which is for inhibiting vibrations of a vehicle M's engine from transmitting. As illustrated in the drawing, the vibration controller comprises an engine mount 14, which is provided with an actuator, an active vibration insulator, (hereinafter simply referred to as an "engine mount"), a controller unit 20, and an actuator 30. The controller unit 20 generates control signals. The actuator 30 actuates an electromagnetic actuator 15 of the engine mount 14 based on the control signals. Moreover, the vehicle M comprises a vehicle body 10 which is equipped with the engine mount 14. The engine mount 14 supports an engine 11, a vibration generating source.

The engine mount 14 comprises a cylinder-shaped housing (not shown), a vibration insulator rubber (not shown) disposed in the cylinder-shaped housing, and the electromagnetic actuator 15 disposed in the cylinder-shaped housing. The electromagnetic actuator 15 can be a solenoid or an electromagnet, for instance, and controls the dynamic displacements of the engine 11 by the displacements of the vibration insulator rubber. The engine mount 14 is fastened to the vehicle body 10 at the lower fastening shaft (not shown), and is installed to the engine 11 at the upper fastening shaft (not shown), thereby supporting the engine 11. Moreover, a rotary pulse sensor 12 is disposed adjacent to the crankshaft of the engine 11. The rotary pulse sensor 12 detects engine revolutions, and outputs rotary pulsating signals of the crankshaft to the controller unit 20.

The controller unit 20 comprises a signal retriever 21, a frequency judge 22, a set-up frequency judge/switcher 23, an idling control signal data storage 24, an idling control signal computer 25, a running control signal data storage 26, and a running control signal computer 27.

The signal retriever 21 receives rotary pulsating signals S output from the rotary pulse sensor 12, and retrieves the frequencies of the rotary pulsating signals S and various driving conditions which correlate to the amplitudes and phases of the rotary pulsating signals S. The frequency judge 22 judges whether the frequencies of the rotary pulsating signals S, which the signal retriever 21 retrieves, are a controlled frequency or not. Note that the frequency of the rotary pulsating signals S, which the frequency judge 22 judges to be the controlled frequency, will be hereinafter simply referred to as a "control frequency." Moreover, the frequency judge 22 outputs the control frequency to the set-up frequency judge/switcher 23.

The set-up frequency judge/switcher 23 judges whether the control frequency is a set-up frequency F or less, and whether the control frequency is higher than the set-up frequency $F_s$. When the control frequency is the set-up frequency $F_s$ or less, the set-up frequency judge/switcher 23 outputs the control frequency to the idling control signal computer 25. On the other hand, when the control frequency is higher than the set-up frequency $F_s$, the set-up frequency judge/switcher 23 outputs the control frequency to the running control signal computer 27. That is, the set-up frequency judge/switcher 23 has a function of switching the control signal computation from the idling control signal computer 25 to the running control signal computer 27 or vice versa.

In the vibration controller according to Example No. 1 of the present invention, the set-up frequency $F_s$ is calculated by following equation (1).

$$F_s = (NE/60)/(N_c/k) \quad (1)$$

wherein $F_s$ specifies the set-up frequency (in Hz);
NE specifies engine revolutions per 1 minute (in r/min);
$N_c$ specifies crankshaft revolutions resulting from ignitions in all engine cylinders (in r); and
k specifies the number of engine cylinders (in pieces). Note that the set-up frequency $F_s$, a boundary frequency between the engine 11's idling range and the engine 11's running range, lies in a region where "NE," the engine 11's revolutions per 1 minute, falls in a range of from 1,000 to 1,500 rpm.

For example, in the case of the 6-cylinder and 4-cycle gasoline engine, a vibration generating source in Example No. 1, the number of engine cylinders k is 6 pieces; and the crankshaft revolutions $N_c$, resulting from ignitions in all engine cylinders, are 2 revolutions. Moreover, when the engine revolutions NE per 1 minute is 1,000 rpm at the boundary between the engine 11 under idling and under running, the set-frequency frequency $F_s$ is 50 Hz. In addition, note that the engine revolutions NE and $N_c$ are equivalent to the revolutions of the crankshaft, an engine output shaft.

In the vibration controller according to Example No. 1 of the present invention, the set-up frequency judge/switcher 23 outputs the control frequency to the idling control signal computer 25 when the control frequency is 50 Hz or less. On the other hand, the set-up frequency judge/switcher 23 outputs the control frequency to the running control signal computer 27 when the control frequency is higher than 50 Hz.

The idling control signal data storage 24 stores a large number of idling control signal data which correspond to the conditions of the engine 11 under idling. Note that the idling control signal data are prepared in advance based on the frequencies of the rotary pulsating signals S. That is, the idling control signal data storage 24 stores idling control signal data which correspond to the frequencies of the rotary pulsating signals S.

When the set-up frequency judge/switcher 23 inputs the control frequency into the idling control signal computer 25, the idling control signal computer 25 selects one of the idling control signal data, which correspond to the input control signal, from a large number of the idling control signal data which are stored in the idling control signal data storage 24. Moreover, the idling control signal computer 25 generates an idling control signal based on one of the selected idling control signal data. That is, the idling control signal computer 25 generates an idling control signal when the control frequency is the set-up frequency $F_s$ or less.

The running control signal data storage 26 stores a large number of running control signal data which correspond to the conditions of the engine 11 under running. Note that the running control signal data are prepared in advance based on the frequencies of the rotary pulsating signals S. That is, the running control signal data storage 26 stores running control signal data which correspond to the frequencies of the rotary pulsating signals S.

When the set-up frequency judge/switcher 23 inputs the control frequency into the running control signal computer 27, the running control signal computer 27 selects one of the running control signal data, which correspond to the input control signal, from a large number of the running control signal data which are stored in the running control signal data storage 26. Moreover, the running control signal computer 27 generates a running control signal based on one of the selected running control signal data. That is, the running control signal computer 27 generates a running control signal when the control frequency is higher than the set-up frequency $F_s$.

As illustrated in FIG. 1, the output sides of the idling control signal computer 25 and running control signal computer 27 are connected with the actuator 30 for actuating the electromagnetic actuator 15 of the engine mount 14, respectively. The actuator 30 turns on or off electricity supply to the electromagnetic actuator 15, thereby actuating the electromagnetic actuator 15. Moreover, the actuator 30 actuates the electromagnetic actuator 15 based on the idling control signal when the control frequency is the set-up frequency $F_s$ or less. On the other hand, the actuator 30 actuates the electromagnetic actuator 15 based on the running control signal when the control frequency is higher than the set-up frequency $F_s$.

Subsequently, the generation of a control signal C will be hereinafter described.

(1) Vehicle M Under Idling

Figure 2:
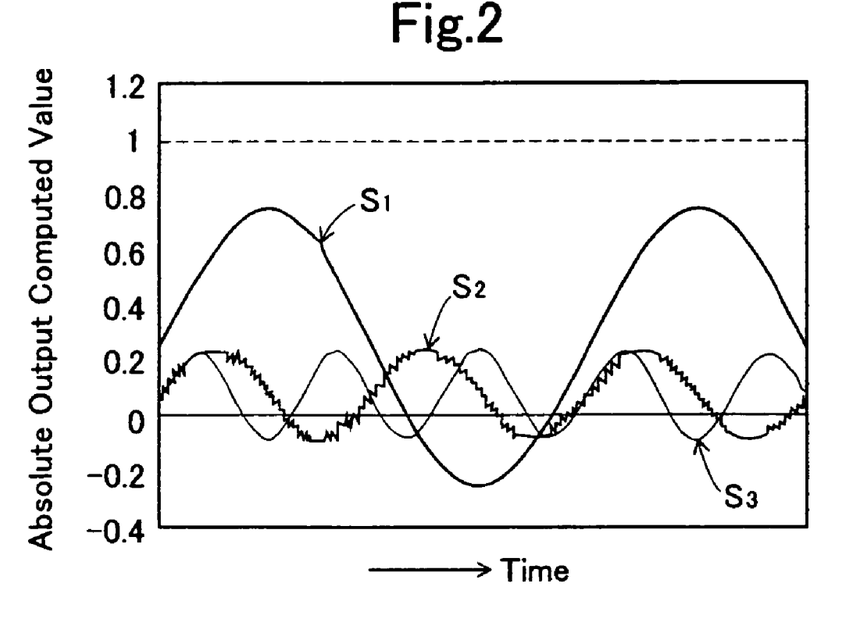
FIG. 2 is a graph, for illustrating a fundamental-wave signal component, a secondary harmonic signal component and a tertiary harmonic signal component which make a control signal according to Example No. 1 of the present invention for a vehicle under idling.
Figure 3:
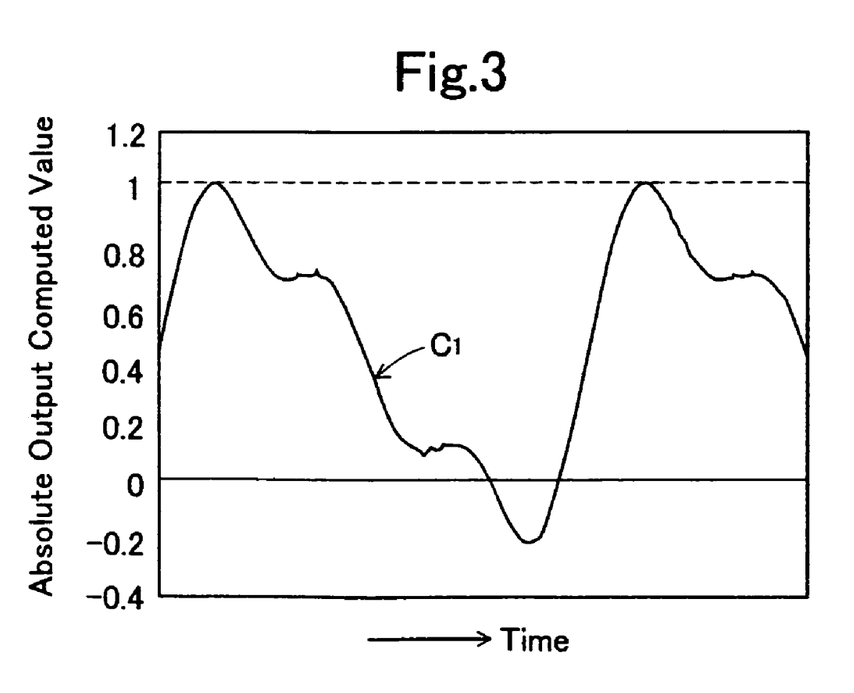
FIG. 3 is a graph for illustrating absolute output computed values produced by synthesizing the fundamental-wave signal component, the secondary harmonic signal component and the tertiary harmonic signal component which make the control signal according to Example No. 1 for the vehicle under idling.

Firstly, in the vehicle M under idling, an idling control signal y is produced by synthesizing a fundamental-wave signal component $S_1$, a secondary harmonic signal component $S_2$ and a tertiary harmonic signal component $S_3$. Note that the fundamental-wave signal component $S_1$ is a sine-wave signal of the control frequency, sine-wave signal which is expressed by following equation (2). In the equation, "k"=1, 2 and 3 designate the orders of frequency, "$a_n$ and $\phi_n$" designate the amplitude and phase of frequency, "n" designates time, and "offset" designates the offset magnitudes of output computed values, respectively. FIG. 2 illustrates the fundamental-wave signal component $S_1$, the secondary harmonic signal component $S_2$, and the tertiary harmonic signal component $S_3$. FIG. 3 illustrates an output computed value $C_1$ which is produced by synthesizing the fundamental-wave signal component $S_1$, secondary harmonic signal component $S_2$ and tertiary harmonic signal component $S_3$. The idling control signal data storage 24 stores the output computed value $C_1$ as a data map on frequencies in the vehicle M under idling.

Equation (2):

$$y_{(n)} = \sum_{k=1}^{k} (a_{k(n)}/2) \cdot \sin(k\omega \cdot \Delta T \cdot n + \phi_{k(n)}) + a_{k(n)}/\text{offset}$$

(2) Vehicle M Under Running

Figure 4:
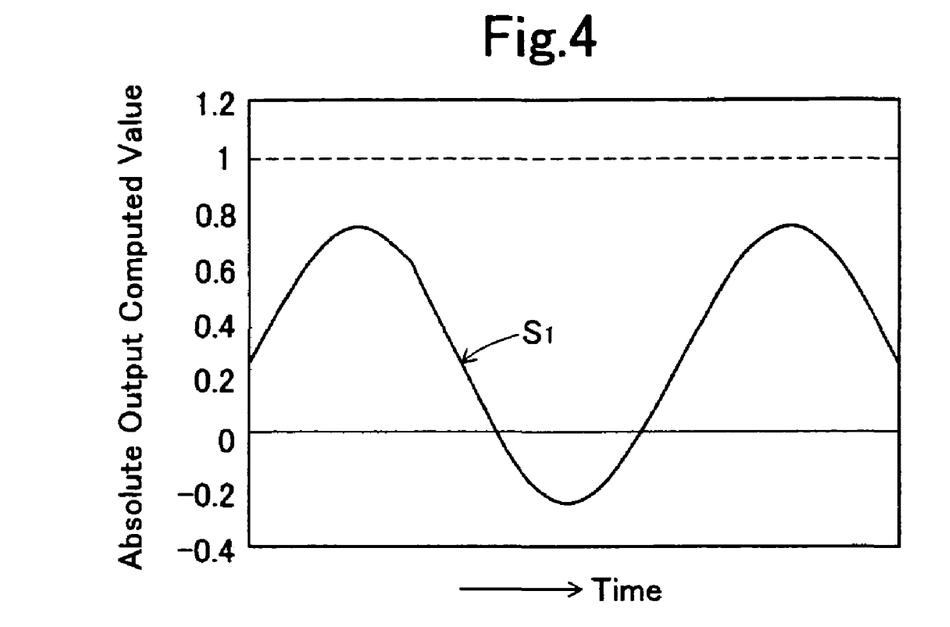
FIG. 4 is a graph for illustrating a fundamental-wave signal component which makes a control signal according to Example No. 1 for a vehicle under running.
Figure 5:
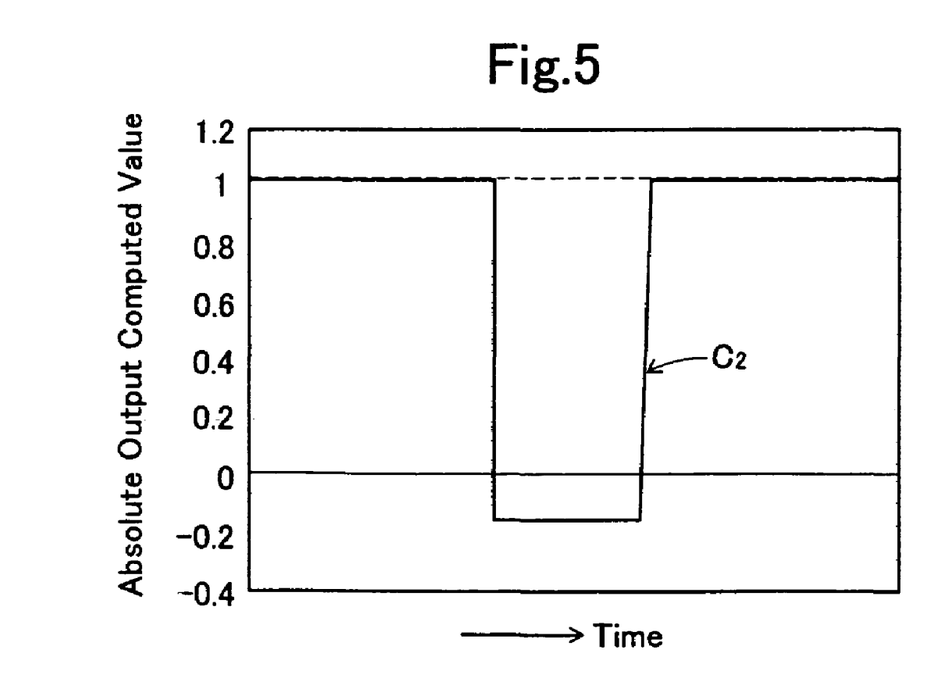
FIG. 5 is a graph for illustrating absolute output computed values produced by converting the fundamental-wave signal component into a rectangle-shaped wave signal which makes the control signal according to Example No. 1 for the vehicle under running.

Then, in the vehicle M under running, a running control signal y is an output computed value $C_2$, a rectangle-shaped wave. Note that the output computed value $C_2$ is produced by giving a correction, which is expressed by following equation (4), to a fundamental-wave signal component $S_1$. Also note that the fundamental-wave signal component $S_1$ is a sine-wave signal of the control frequency, sine-wave signal which is expressed by following equation (3) and is free from a secondary harmonic signal component $S_2$ and a tertiary harmonic signal component $S_3$. In the equations, "k"=1, 2 and 3 designate the orders of frequency, "$a_n$ and $\phi_n$" designate the amplitude and phase of frequency, "n" designates time, and "offset" designates the offset magnitudes of output computed values, respectively. FIG. 4 illustrates the fundamental-wave signal component $S_1$, a sine-wave signal of the control signal. FIG. 5 illustrates the output computed value $C_2$ which is produced by correcting the base-wave signal component $S_1$ in accordance with equation (4). The running control signal data storage 26 stores the output computed value $C_2$ as a data map on frequencies in the vehicle M under running.

Equation (3):

$$y_{(n)} = \sum_{k=1}^{k} (a_{k(n)}/2) \cdot \sin(k\omega \cdot \Delta T \cdot n + \phi_{k(n)}) + a_{k(n)}/\text{offset}$$

when $y_{(n)} \geq 0$, $y_{(n)} = a_{k(n)}$; and when $y_{(n)} < 0$, $y_{(n)} = -0.15$    Equation (4):

How the vibration controller according to Example No. 1 of the present invention operates will be hereinafter described.

When the vehicle M is under idling, the rotary pulse sensor 12 outputs a rotary pulsating signal S to the controller unit 20. The signal retriever 21 of the controller unit 20 retrieves the rotary pulsating signal S. Subsequently, the frequency judge 22 judges whether the frequency of the rotary pulsating signal S (or control frequency) is a controlled frequency or not. Then, when the frequency of the rotary pulsating signal S equals the controlled frequency, the set-up frequency judge/switcher 23 judges whether the frequency of the rotary pulsating signal S is a set-up frequency $F_2$ or less.

Moreover, when the frequency of the rotary pulsating signal S (or control frequency) is the set-up frequency $F_2$ or less, the idling control signal computer 25 retrieves idling control signal data, which correspond to the amplitude and phase of the rotary pulsating signal S input from the signal retriever 21, from the idling control signal data storage 24. In addition, the idling control signal computer 25 generates an idling control signal based on an output computed value $C_1$, one of idling control signal data, which is produced by superimposing a fundamental-wave signal component $S_1$ of the control frequency, a secondary harmonic signal component $S_2$ and a tertiary harmonic signal component $S_3$. Thus, the idling control signal computer 25 outputs the resulting idling control signal to the actuator 30.

The actuator 30 generates an actuating signal based on the input idling control signal, and turns on the electricity supply for the electromagnetic actuator 15. When the electromagnetic actuator 15 is actuated, the vibrating forces of the engine mount 15 are applied to the engine 11. Accordingly, the engine mount 15 inhibits the vibrations of the engine 11 under idling from transmitting.

Note herein that the idling control signal involves the secondary harmonic signal component $S_2$ and the tertiary harmonic signal component $S_3$ in addition to the fundamental-wave signal component $S_1$, a sine-wave signal of the rotary pulsating signal S (or control frequency). Consequently, not only it is possible to adequately inhibit the engine 11's vibrations, whose frequency equals the control frequency, from transmitting, but also it is possible to appropriately suppress the generation of noises resulting from the secondary and tertiary harmonic signal components $S_2$, $S_3$ with respect to the control frequency.

On the other hand, when the vehicle M is under high-frequency running, the frequency of a rotary pulsating signal S (or control frequency) is higher than the set-up frequency $F_s$. When the frequency of a rotary pulsating signal S is thus higher than the set-up frequency $F_s$, the running control signal computer 27 retrieves running control signal data, which correspond to the amplitude and phase of the rotary pulsating signal S input from the signal retriever 21, from the running control signal data storage 26. Moreover, the running control signal computer 27 computes to generate a running control signal based on an output computed value $C_2$. Note that the output computed value $C_2$ is one of running control signal data, which is produced by correcting a fundamental-wave signal component S, a sing-wave signal of the frequency of the rotary pulsating signals, in accordance with above-described equation (3). Thus, the running control signal computer 27 outputs the resultant running control signal to the actuator 30.

The actuator 30 generates an actuating signal based on the input running control signal, and turns on the electricity supply for the electromagnetic actuator 15. When the electromagnetic actuator 15 is actuated, the vibrating forces of the engine mount 15 are applied to the engine 11. Accordingly, the engine mount 15 inhibits the vibrations of the engine 11 under running from transmitting.

In this way, the running control signal results from the output computed value $C_2$, a rectangle-shaped wave signal which is converted from the sine-wave signal of the frequency of the rotary pulsating signal S (or control signal). Accordingly, when actuating the electromagnetic actuator 15 exhibiting slow response, the rectangle-shaped wave signal can compensate the retarded response of the electromagnetic actuator 15. Consequently, the engine mount 15 can produce vibrating forces sufficiently.

As described above, the vibration controller according to Example No. 1 of the present invention actuates the electromagnetic actuator 15 with the idling control signal and the running control signal, which are distinctive to each other for controlling low-frequency vibrations of the vehicle M under idling and high-frequency vibrations of the vehicle M under running, individually. Therefore, the vibration controller can suppress the generation of noises resulting from the secondary harmonic signal component $S_2$ and tertiary harmonic signal component $S_3$ in the vehicle M under idling. At the same time, the vibration controller can securely produce sufficient vibrating forces in the vehicle M under running even when the vibration controller uses the less expensive electromagnetic actuator 15 with slow response. As a result, the vibration controller can inhibit the vibrations of the engine 11 from transmitting over a wide range of the vehicle M's driving conditions entirely, even using the less expensive electromagnetic actuator 15, while suppressing the generation of noises.

EXAMPLE NO. 2

A vibration controller according to Example No. 2 of the present invention, a modified version of Example No. 1, will be hereinafter described.

Figure 6:
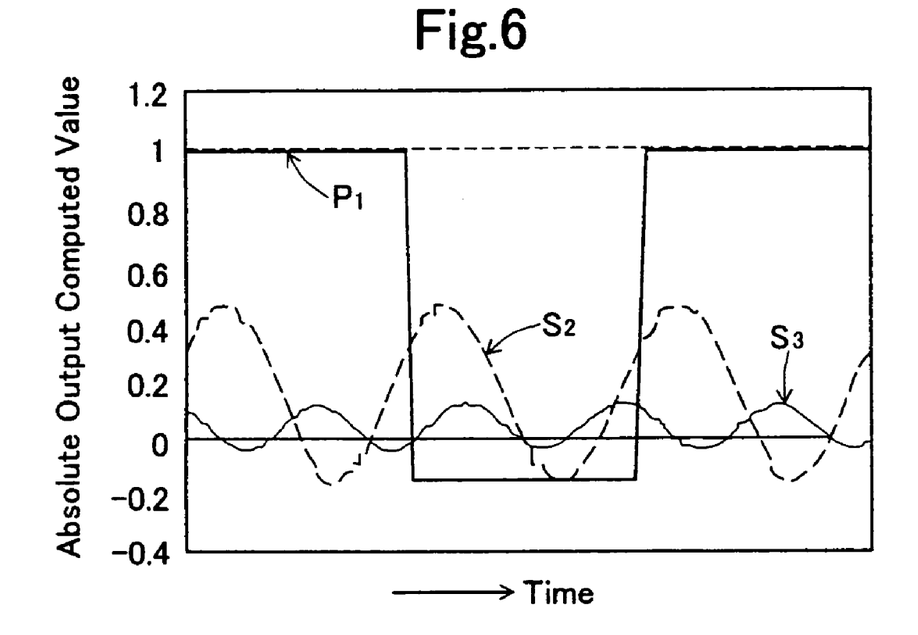
FIG. 6 is a graph for illustrating a fundamental-wave signal component, a secondary harmonic signal component and a tertiary harmonic signal component which make a control signal according to Example No. 2 of the present invention for a vehicle under idling.
Figure 7:
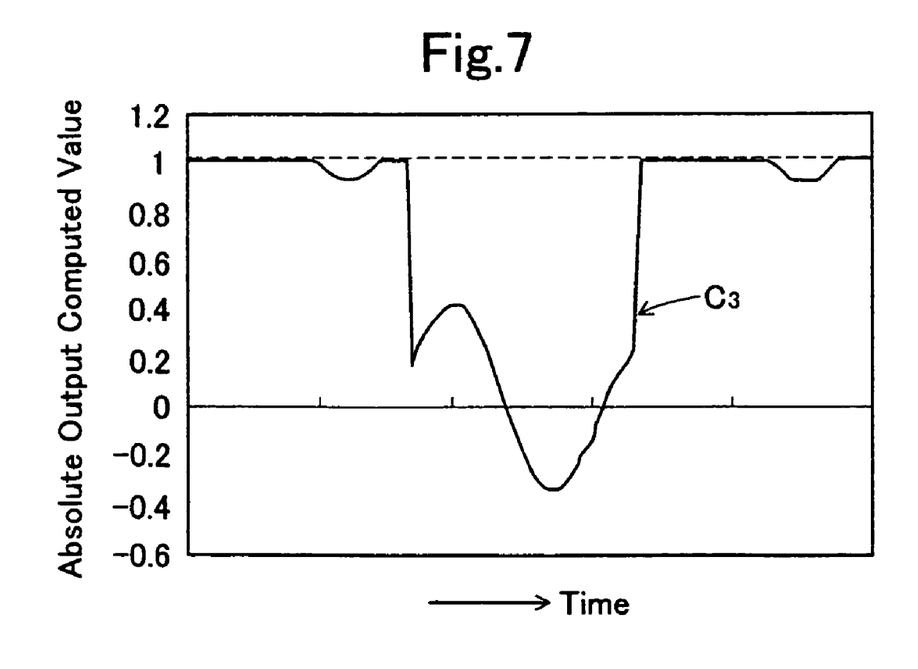
FIG. 7 is a graph for illustrating absolute output computed values produced by synthesizing the fundamental-wave signal component, the secondary harmonic signal component and the tertiary harmonic signal component which make the control signal according to Example No. 2 for the vehicle under idling.

In the vibration controller according to Example No. 2 of the present invention, an idling control signal y for inhibiting the low-frequency vibrations of the engine 11 under idling from transmitting comprises a fundamental-wave signal component, a secondary harmonic signal component $S_2$, and a tertiary harmonic signal component $S_3$ which are superimposed one after another. Specifically, as illustrated in FIG. 6, the fundamental-wave signal component is a rectangle-shaped wave signal $P_1$ which is expressed by following equation (5). The secondary harmonic signal component $S_2$ and tertiary harmonic signal component $S_3$ are sine-wave signals similarly to those of Example No. 1. Note that the notations in equation (5) are identical with those in above-described equations (2) through (4). FIG. 6 illustrates the rectangle-shaped wave signal component $P_1$ as the fundamental-wave signal component, and the sine-wave signals as the secondary harmonic signal component $S_2$ and tertiary harmonic signal component $S_3$. FIG. 7 illustrates an output computed value $C_3$ which are produced by synthesizing the rectangle-shaped wave signal component $P_1$, secondary harmonic signal component $S_2$ and tertiary harmonic signal component $S_3$. Note that the upper value of the absolute output computed value $C_3$ is set at 1. The idling control signal data storage 24 stores the output computed value $C_3$ as a data map on frequencies in the vehicle M under idling.

Equation (5):

For $k = 1$,

-continued when $y \geq 0$, $y = a_1$; and when $y < 0$, $y = -0.15$

For $k = 2$ and 3, $$y_{(n)} = \sum_{k=1}^{k} (a_{k(n)}/2) \cdot \sin(k\omega \cdot \Delta T \cdot n + \phi_{k(n)}) + a_{k(n)}/\text{offset}$$

$$y = y_{(1)} + y_{(2)} + y_{(3)}$$

The vibration controller according to Example No. 2 of the present invention uses the idling control signal y, which involves the secondary harmonic signal component $S_2$ and tertiary harmonic signal component $S_3$ in addition to the rectangle-shaped wave signal component $P_1$, the fundamental-wave signal component of the control frequency. When the fundamental-wave signal component of the control signal thus comprises a rectangle-shaped wave signal, it is possible to enhance the vibrating forces of the engine mount 14 because the rectangle-shaped wave signal compensates for the insufficient response of the slow-response electromagnetic 15 as well. Therefore, it is possible to adequately inhibit the engine 11's vibrations, whose frequencies equal the control frequency, from transmitting. Moreover, it is possible to appropriately suppress the generation of noises resulting from the secondary harmonic signal component $S_2$ and tertiary harmonic signal component $S_3$ with respect to the control frequency.

In the vibration controllers according to Example Nos. 1 and 2 of the present invention, the data storages 24, 26 store the control signal data which are found in advance for the idling control signal and running control signal; and the computers 25, 27 select one of the control signal data from the data storages 24, 26 to generate the idling control signal and running control signal. However, not limited to this, it is possible as well to generate the idling control signal and running control signal by adaptive control methods, for example. In addition, Example Nos. 1 and 2 described above are a few examples of the present invention. Therefore, it is possible to carry out the present invention with various changes and modifications as far as they do not deviate from the gist of the present invention.

INDUSTRIAL APPLICABILITY

In accordance with a method for actuating active vibration insulators according to the present invention, electromagnetic actuators are actuated with an idling control signal and a running control signal, which are distinctive to each other for controlling low-frequency vibrations of vehicles under idling and high-frequency vibrations of vehicles under running, individually. Therefore, the present method can suppress the generation of noises resulting from secondary harmonic signal components and tertiary harmonic signal components with respect to control frequencies in vehicles under idling. Moreover, when the present method employs a rectangle-shaped wave signal, which is produced by converting a sine-wave signal of control frequencies into a rectangle-shaped wave, as the running control signal for inhibiting high-frequency vibrations of running vehicles from transmitting, it is possible even for less expensive electromagnetic actuators with slow response to securely produce sufficient vibrating forces. Thus, the present method can inhibit vibrations of engines from transmitting over a wide range of vehicles' driving conditions entirely, even using less expensive electromagnetic actuators, while suppressing the generation of noises. Hence, the present method is useful industrially.

Having now fully described the present invention, it will be apparent to one of ordinary skill in the art that many changes and modifications can be made thereto without departing from the spirit or scope of the present invention as set forth herein including the appended claims.

What is claimed is:

1. A method for actuating active vibration insulators, the method comprising:
    judging whether a control frequency, which is based on a cyclic pulsating signal emitted from a vehicle engine, is at a set-up frequency or less;
    generating an idling control signal in an idling range of a vehicle, the idling range corresponding to a first range in which the control frequency is at the set-up frequency or less, wherein the idling control signal is produced by adding a higher order harmonic signal component with respect to the control frequency to a fundamental-wave signal component of the control frequency;
    generating a running control signal in a running range of the vehicle, the running range corresponding to a second range in which the control frequency is higher than the set-up frequency, wherein the running control signal is composed of only the fundamental-wave signal component of the control frequency; and
    actuating an electromagnetic actuator of an active vibration insulator based on one of the idling control signal and the running control signal, thereby inhibiting vibrations of the vehicle engine from transmitting vibrating forces exerted by the electromagnetic actuator.

2. The method set forth in claim 1, wherein the higher order harmonic signal component comprises at least one member selected from a group consisting of a secondary harmonic signal component with respect the control signal and a tertiary harmonic signal component with respect thereto.

3. The method set forth in claim 1 further comprising:
    calculating a set-up frequency from following equation (1):

$$F_s = (NE/60)/(N_c/k) \tag{1}$$

wherein $F_s$ specifies the set-up frequency (in Hz);

NE specifies engine revolutions per 1 minute (in r/min) and falls in a range of from 1,000 to 1,5000 rpm;

$N_c$ specifies crankshaft revolutions resulting from ignitions in all engine cylinders (in r); and k specifies the number of engine cylinders (in pieces); wherein the idling range comprises a first vibration range whose frequency is the set-up frequency or less; and the running range comprises a second vibration range whose frequency is higher than the set-up frequency.

4. The method set forth in claim 1, wherein the running control signal comprises a rectangle-shaped wave signal which is produced by converting a sine-wave signal of the control frequency into a rectangle-shaped wave.

5. The method set forth in claim 1, wherein the fundamental-wave signal component of the idling control signal comprises a sine-wave signal of the control frequency.

6. The method set forth in claim 1, wherein the fundamental-wave signal component of the idling control signal comprises a rectangle-shaped wave signal which is produced by converting a sine-wave signal of the control frequency into a rectangle-shaped wave.

* * * * *